United States Patent

Mowry et al.

[11] Patent Number: 5,559,429
[45] Date of Patent: Sep. 24, 1996

[54] MR HEAD LAP MONITOR RESISTORS

[75] Inventors: Gregory S. Mowry; Phillip E. Gorka, both of Burnsville; Brian D. Strayer, Minneapolis; Alan G. Kracke, Minnetonka, all of Minn.

[73] Assignee: Seagate Technology, Inc., Scotts Valley, Calif.

[21] Appl. No.: 421,205

[22] Filed: Apr. 13, 1995

Related U.S. Application Data

[62] Division of Ser. No. 192,673, Feb. 7, 1994, Pat. No. 5,463,805.

[51] Int. Cl.⁶ .......................... G01N 27/04; G01N 19/06
[52] U.S. Cl. .................. 324/71.5; 324/71.1; 324/699; 73/7; 73/104
[58] Field of Search .................. 324/71.1, 71.5, 324/691, 693, 699, 704, 714, 719; 73/7, 104

[56] References Cited

U.S. PATENT DOCUMENTS

| | | | |
|---|---|---|---|
| 4,218,650 | 8/1980 | Matzen | 324/704 X |
| 4,457,114 | 7/1984 | Hennenfent et al. | 51/216 R |
| 4,477,968 | 10/1984 | Kracke et al. | 29/603 |
| 4,536,992 | 8/1985 | Hennenfent et al. | 51/109 R |
| 4,689,877 | 9/1987 | Church | 29/603 |
| 4,841,625 | 6/1989 | Valstyn | 29/603 |
| 4,861,398 | 8/1989 | Fukuoka et al. | 156/64 |
| 4,914,868 | 4/1990 | Church et al. | 51/165.71 |
| 5,065,483 | 11/1991 | Zammit | 29/603 |
| 5,210,667 | 5/1993 | Zammit | 360/113 |
| 5,361,547 | 11/1994 | Church et al. | 451/5 |

FOREIGN PATENT DOCUMENTS 4-53672  2/1992  Japan.

*Primary Examiner*—Kenneth A. Wieder
*Assistant Examiner*—Glenn W. Brown
*Attorney, Agent, or Firm*—Kinney & Lange, P.A.

[57] ABSTRACT

A system for lapping a magnetoresistive (MR) sensor on a slider to a proper height is disclosed. The system comprises simultaneously lapping the MR lap monitor and the MR sensor positioned on the slider until a resistance of a variable resistor located within the MR lap monitor is approximately equal to a resistance of a target resistor located within the MR lap monitor. During the lapping process, a reference resistor located within the lap monitor is compared to both the variable and target resistors to prevent a lapping failure. In one preferred embodiment, the reference, target, and variable resistors are formed from a ferromagnetic metal alloy. The MR lap monitor and the MR sensor are lapped until a height of the ferromagnetic metal alloy forming the variable resistor is approximately equal to a height of the ferromagnetic metal alloy forming the target resistor.

7 Claims, 3 Drawing Sheets

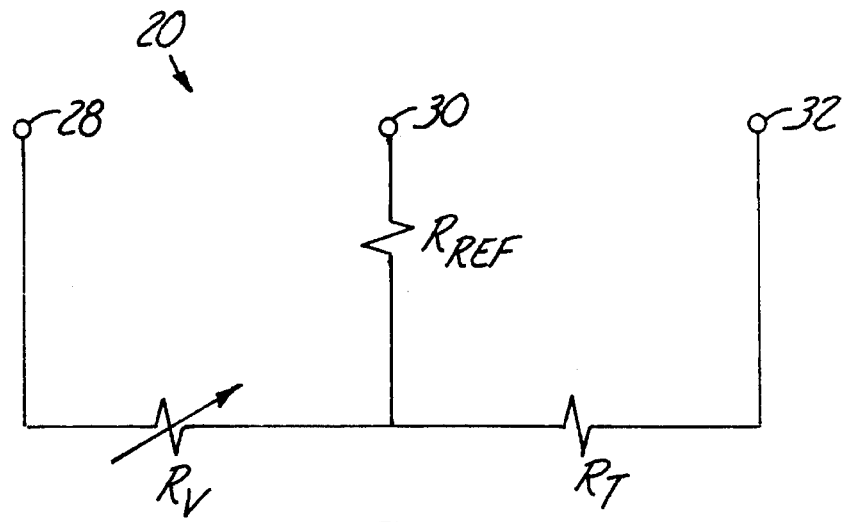
Fig. 4
Fig. 6
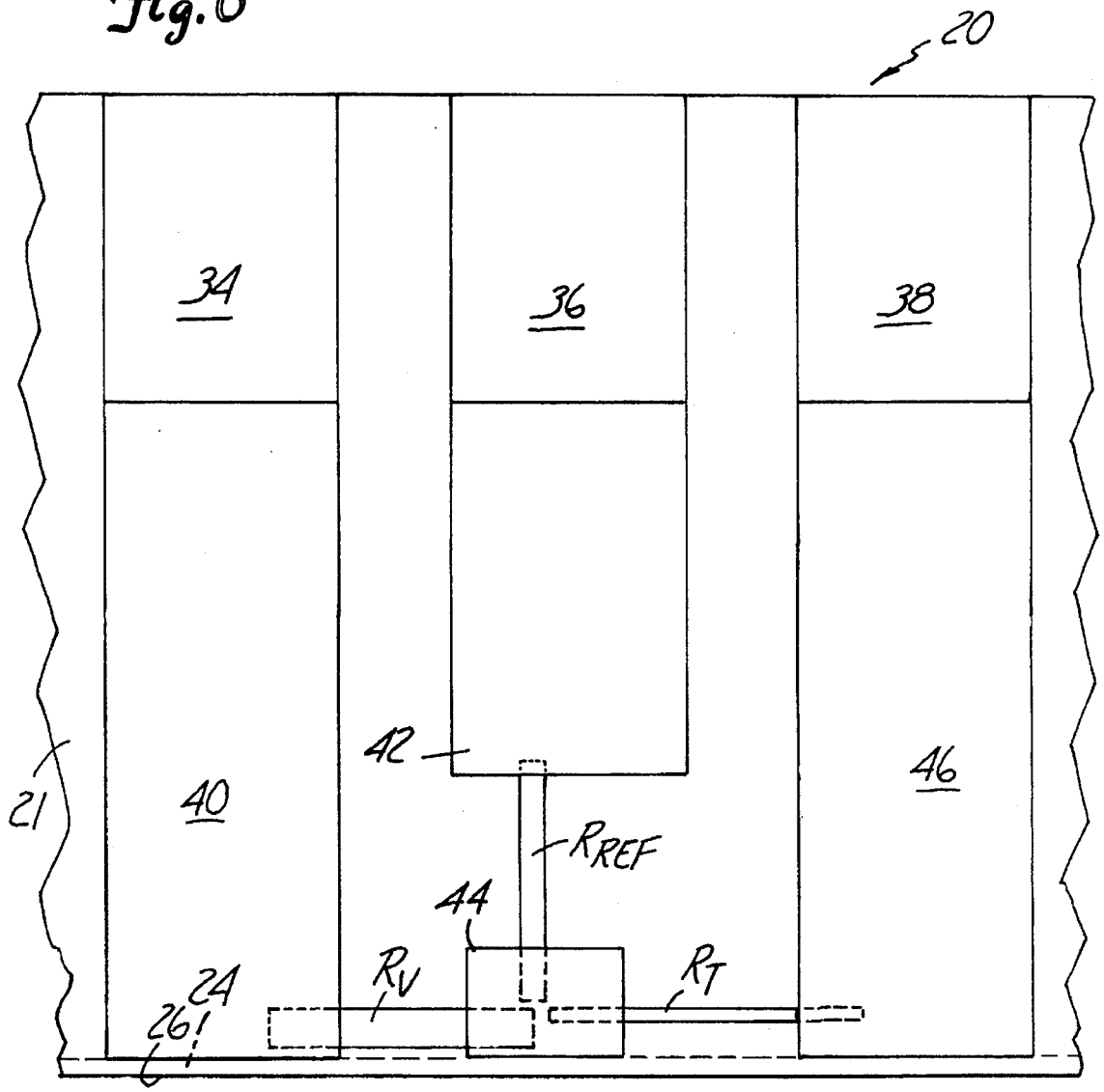

MR HEAD LAP MONITOR RESISTORS

This is a Divisional of U.S. Ser. No. 08/192,673, now Pat. No. 5,463,805, entitled "METHOD OF LAPPING MR SENSORS", issued Nov. 7, 1995.

BACKGROUND OF THE INVENTION

The present invention relates to the fabrication of a slider bearing at least one magnetoresistive sensor for data storage applications, and in particular to a magnetoresistive lap monitor which will control the lapping of the magnetoresistive sensors positioned on the surface of the slider such that the magnetoresistive sensors are lapped to a proper height.

Winchester style sliders having magnetoresistive (MR) sensors are used in magnetic storage systems to detect magnetically encoded information. A time dependent magnetic field from a magnetic storage medium or disc directly modulates the resistivity of the MR sensor. The change in resistance of the MR sensor can be detected by passing a sense current through the MR sensor and measuring the voltage across the MR sensor. The resulting signal can be used to recover information from the magnetic storage medium.

Practical MR sensors are typically formed using ferromagnetic metal alloys because of their abnormally high magnetic permeability. A ferromagnetic material is deposited in a thin film upon the surface of an electrically insulated substrate or wafer. Changing magnetic fields originating from the magnetic storage medium rotate the magnetization of the MR sensor and thereby change the resistance of the sensor. This phenomenon is called the MR effect.

An MR sensor has a maximum signal-to-noise ratio when the active region of the sensor has no magnetic domain boundaries. In other words, the active sense area of the MR sensor should be a single domain. The presence of domain boundaries in the active sense area gives rise to Barkhausen noise, a phenomenon caused by the irreversible motion of a magnetic domain in the presence of an applied magnetic field. Barkhausen noise cannot occur if no domain boundaries exist. Typically, a single magnetic domain MR sensor is achieved by either utilizing geometry or via boundary control stabilization, or both.

In order to efficiently form sliders for thin film recording heads, the following generic machining steps could be performed: (1) slice a substrate or wafer into a series of bars; (2) lap the bars to a final height while statistically monitoring all lap monitor resistors positioned across the bar for average height control; (3) define the slider rails; and (4) free the individual sliders from the bar.

Conventional lap monitors for inductive thin film heads are typically used to lap inductive head bars to a final height (step 2). Conventional inductive lap monitors typically utilize pole metalizations and polymers to form an analog-digital system for end point lap detection. These metalizations are common to the thin film inductive head write structures. However, with sliders having an MR head design positioned on the surface of the slider, the situation is much more complicated since the MR head is a combined MR read, inductive thin film write device. For proper MR reading, it is essential to control the end point lap detection of the slider surface bearing the pair of MR sensors by using features common to the MR sensors. The end point lap detection determines the final height of both the slider rail and the MR sensors. Since inductive thin film lap monitors utilize features common to inductive thin film writers, end point lap detection control of the slider and its MR sensors is degraded if writer based lap monitor resistors are used. This results from a variety of reasons, such as alignment tolerances.

Although one could also use the actual MR sensor as a lap guide, a number of factors have been found that result in a preference of the separate lap monitor resistor over that of using just the MR element. First, if the MR element is used as a lap monitor resistor, it is difficult to augment the device, with additional structure for detecting faults and handling possible contact defects. Furthermore, stray ground loops in the lap machines or static discharge could damage the MR sensor.

Thus, standard factory inductive lap monitors are not suitable for MR heads having an MR reader and an inductive thin film writer. Therefore, there is a need for an MR lap monitor system which can accurately lap MR sensors on the surface of a slider to a proper final height using metalizations and other materials common to the MR element structure.

SUMMARY OF THE INVENTION

The present invention is a system for lapping magnetoresistive (MR) sensors on a surface of a slider to a proper height. The system comprises simultaneously lapping the MR lap monitor and the MR sensors on the surface of the slider until a resistance of a variable resistor located within the MR lap monitor is approximately equal to a resistance of a target resistor located within the MR lap monitor. During the lapping process, a reference resistor located within the MR lap monitor is compared to both the variable and target resistors to identify a lap monitor resistor failure. In one preferred embodiment, the reference, target, and variable resistors are formed from a ferromagnetic metal alloy used in the MR sensor. The MR lap monitor bearing the MR sensors are lapped until a height of the ferromagnetic metal alloy forming the variable resistor is approximately equal to a height of the ferromagnetic metal alloy forming the target resistor. At this point, the resistance of the variable resistor approximately equals the resistance of the target resistor, and therefore, the pair of MR sensors on the surface of the slider has been lapped to its proper height.

BRIEF DESCRIPTION OF THE DRAWINGS

FIG. 4 is a schematic representation of the MR lap monitor of the present invention.

FIG. 6 is a greatly enlarged diagrammatic representation of the MR lap monitor of the present invention.

DETAILED DESCRIPTION OF THE PREFERRED EMBODIMENTS

Figure 1:
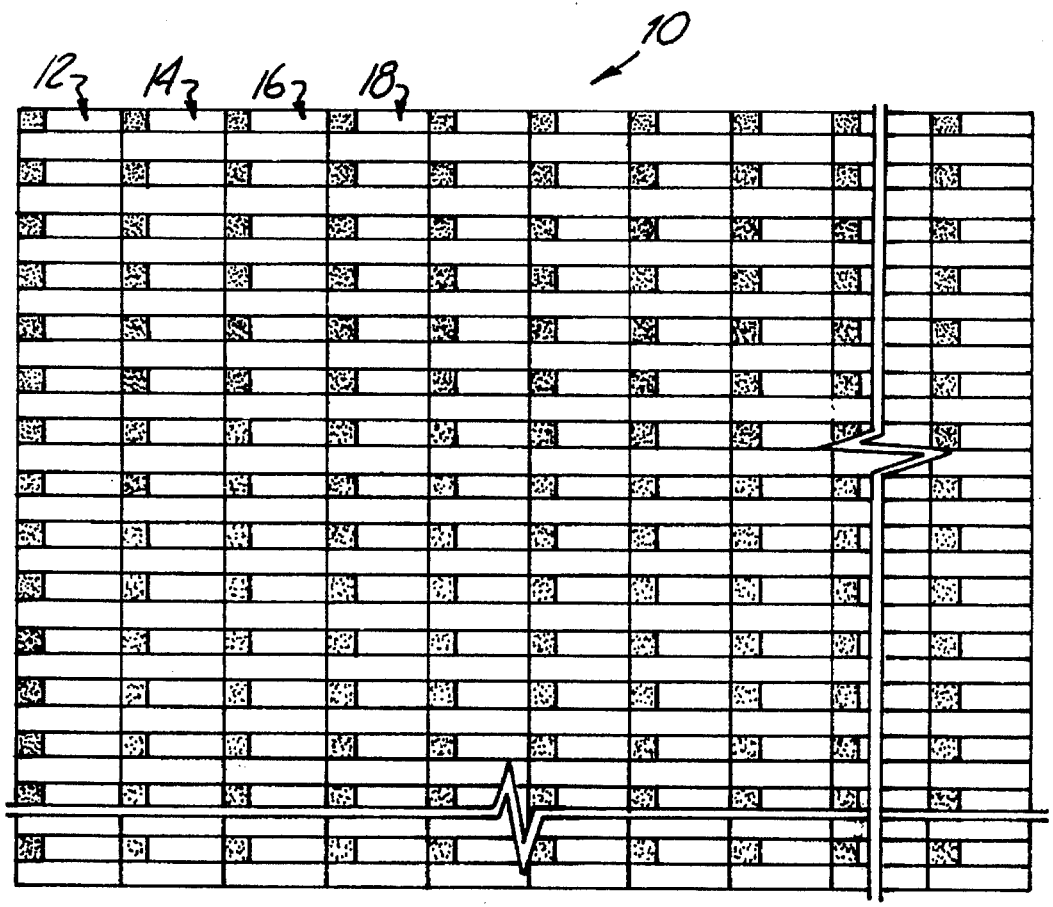
FIG. 1 is a diagrammatic view of a wafer map including several MR lap monitors and sliders bearing MR sensors.
Figure 2:
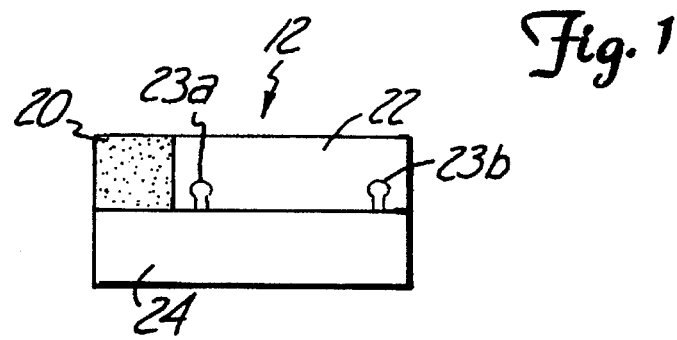
FIG. 2 is a greatly enlarged diagrammatic view of a single MR die.

The present invention facilitates the fabrication of magnetoresistive (MR) sensors. The fabrication process begins with a MR wafer map. FIG. 1 is a diagrammatic view of MR wafer map 10 which includes several similar MR die 12, 14, 16, and 18. MR wafer map 10 can vary in size from as little as one MR die to as many as 100,000 MR die or more. MR die 12, as shown in FIG. 2, includes lap monitor 20, slider 22 having MR sensors 23a and 23b, and saw alley 24. MR lap monitor 20 is the portion of MR die 12 which controls the final dimensions of both slider 22 and MR sensors 23a and 23b.

For an MR sensor, similar to MR sensors 23a and 23b, to be fabricated such that it can be incorporated into a slider and precisely detect signals from a magnetic storage medium or disc during a read operation, the geometrical dimensions of both the slider and the MR sensors, especially the height of the MR sensors, must be meticulously precise. In order to accurately develop the plurality of sliders from MR wafer map 10, MR wafer map 10 must first be sliced into a plurality of bars or rows.

Figure 3:
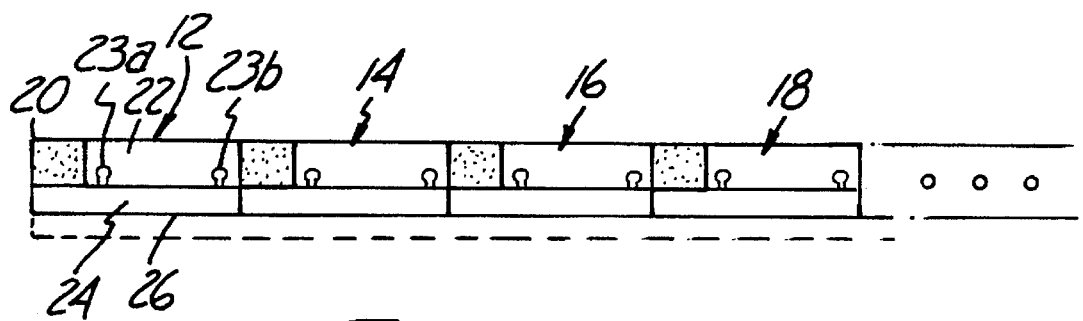
FIG. 3 is a greatly enlarged diagrammatic view of a bar of MR die prior to being lapped to a final height.

FIG. 3 is a greatly enlarged diagrammatic view showing a single bar of MR dies 12, 14, 16, 18 from MR wafer map 10 after MR wafer map 10 has been sliced into a plurality of bars. MR wafer map 10 is sliced through the numerous saw alleys similar to saw alley 24. MR die, such as MR die 12, consist of MR lap monitor 20, slider 22 having MR sensors 23a and 23b, and a thin layer of remaining saw alley 24 having bottom surface 26.

FIG. 4 is a schematic representation of MR lap monitor 20. MR lap monitor 20 includes terminals 28, 30, and 32, reference resistor $R_{REF}$, variable resistor $R_v$, and target resistor $R_T$. Terminals 28, 30, and 32, which are also called pads or bond pads, permit MR lap monitor 20 to connect to external circuitry. Once wafer 10 has been sliced into the plurality of bars, the lapping process begins. The plurality of MR dies on a single bar, such as MR dies 12, 14, 16, and 18, are all simultaneously lapped. During the lapping process, bottom surface 26 of the bar containing MR dies 12, 14, 16, and 18 is lapped using a lap machine. The lap machine comprises a rotating circular plate with a flat, horizontal abrasive-laden surface against which bottom surface 26 of the bar is forced by both gravity and a series of weights.

Variable resistor $R_V$, target resistor $R_T$, and reference resistor $R_{REF}$ are formed using the same ferromagnetic metal alloy that forms the MR sensor. Thus, a change in the height of a ferromagnetic material forming a resistor will result in a change in the resistance of the resistor.

During the lapping process, variable resistor $R_V$ is lapped thereby changing the resistance of variable resistor $R_V$. Variable resistor $R_V$ is lapped until its resistance is equal to the resistance of target resistor $R_T$. When the resistance of variable resistor $R_V$ is equal to the resistance of target resistor $R_T$, the height of MR sensors 23a and 23b positioned on bottom surface 26 of slider 22 adjacent to lap monitor 20 is within an acceptable tolerance of the desired height of MR sensors 23a and 23b and the lapping process is complete. In one preferred embodiment, an acceptable tolerance is one half of one micron range.

During the lapping process, reference resistor $R_{REF}$ is continuously compared to variable resistor $R_V$ and to target resistor $R_T$ by a suitable series of resistance measurements across terminals 28, 30, and 32. Reference resistor $R_{REF}$ is necessary to prevent erroneous results during the lapping process due to defects in the ferromagnetic metal alloy forming variable resistor $R_V$ or target resistor $R_T$ which may be initially present or occur during the lapping process. These erroneous results could give an artificial agreement between resistors $R_V$ and $R_T$ prematurely. As shown in FIG. 6, reference resistor $R_{REF}$ is positioned away from bottom surface 26. This positioning is critical to fabricate a proper MR lap monitor resistor. The resistance of reference resistor $R_{REF}$ must be invariant during the lapping process; therefore, reference resistor $R_{REF}$ must be positioned so that the configuration of $R_{REF}$ is constant during the lapping process.

Figure 5:
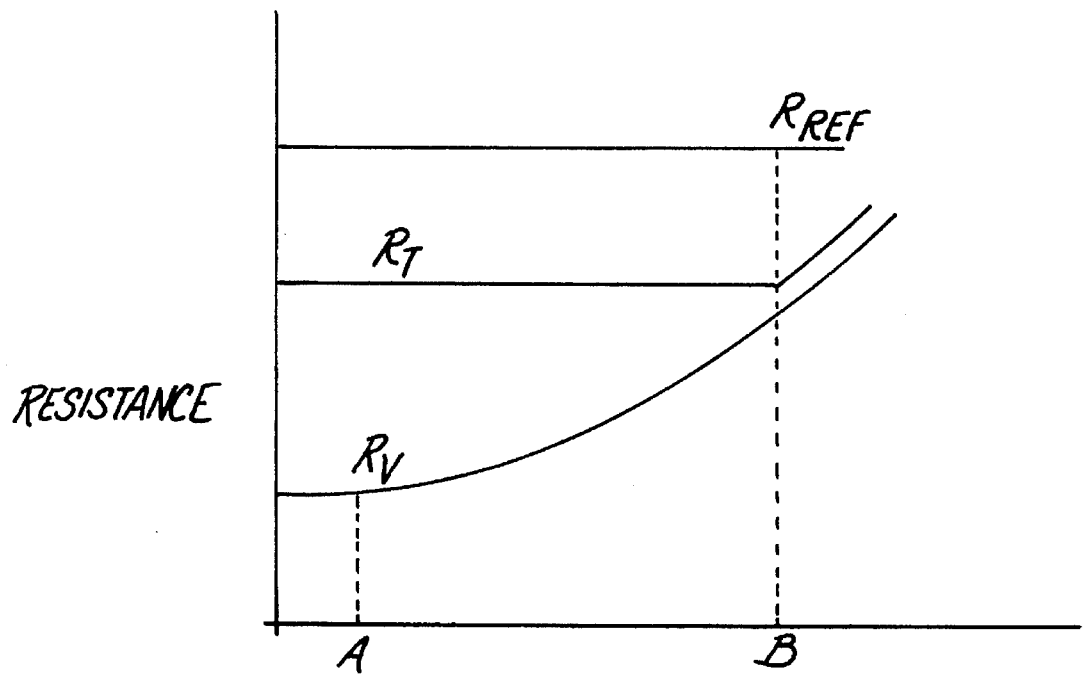
FIG. 5 is a graph showing one implementation of the resistances of various resistors as a function of lap depth in accordance with the present invention.

FIG. 5 is a graph showing the resistances of reference resistor $R_{REF}$, target resistor $R_T$, and variable resistor $R_V$ as a function of lap depth (shown in arbitrary units). Point A on the graph in FIG. 5 represents the lap depth at which the remaining portion of saw alley 24 has been lapped away and the resistance of variable resistor $R_V$ begins to change. Point B on the graph in FIG. 5 represents the lap depth at which the resistance of variable resistor $R_V$ equals the resistance of target resistor $R_T$ (within acceptable tolerances). The offset shown in FIG. 5 is for clarity purposes. At the point when the resistance of variable resistor $R_V$ equals the resistance of target resistor $R_T$ (within acceptable tolerances), the lapping process is completed and the height of MR sensors 23a and 23b, positioned on bottom surface 26 of slider 22 adjacent to lap monitor 20, are within an acceptable tolerance (one half of one micron range) of the desired height of MR sensor 22.

During the lapping process, either $R_{REF}$ or the ratio of resistances between reference resistor $R_{REF}$ and target resistor $R_T$ should remain constant until variable resistor $R_V$ equals target resistor $R_T$ (Point B in FIG. 5). If during the lapping process, either $R_{REF}$ or the ratio between reference resistor $R_{REF}$ and target resistor $R_T$ begins to change, a lapping error has occurred. Whenever a lapping error is detected, data from that particular lap monitor is discarded.

The ratio between reference resistor $R_{REF}$ and variable resistor $R_V$, as well as the ratio between target resistor $R_T$ and variable resistor $R_V$, should be gradually changing during the lapping process until variable resistor $R_V$ equals target resistor $R_T$. If there is a significant instantaneous change in either of these ratios, a lapping failure is detected and again data from that lap monitor should be discarded. Once the resistance of variable resistor $R_V$ equals the resistance of target resistor $R_T$, the ratio between variable resistor $R_V$ and target resistor $R_T$ will be constant. If a constant ratio is observed for a prolonged period of time, the lapping process has continued for too long of a time period and a lapping error is detected.

FIG. 6 is a greatly enlarged diagrammatic representation of MR lap monitor 20 of the present invention. MR lap monitor 20 is formed on substrate 21 and includes variable resistor $R_V$, target resistor $R_T$, reference resistor $R_{REF}$, bottom surface 26, bond pads 34, 36, and 38, and contacts 40, 42, 44, and 46. Bond pads 34, 36, and 38 represent ports 28, 30, and 32 of FIG. 4 and permit MR lap monitor 20 to be connected to external circuitry.

Contacts 40, 42, 44, and 46 can be formed from any type of conductor. However, in a preferred embodiment, bond pads 34, 36, and 38 and contacts 40, 42, 44, and 46 (sometimes called leads) are formed from the same high conductivity metalization alloy used to connect up the MR sensor. This high conductivity metalization alloy permits signals to be transduced from external circuitry through bond pads 34, 36, and 38 and through contacts 40, 42, 44, and 46 to variable resistor $R_V$, target resistor $R_T$, and reference resistor $R_{REF}$. Signals are also transduced from the resistors to the external circuitry via the contacts and the pads. MR sensor contact variations due to differences in the alloys used in contacts 40, 42, 44, and 46 are negligible.

The lapping process begins by lapping the remaining portion of saw alley 24 until $R_V$ is exposed and also begins to be lapped. The lapping process is continued until the height of the ferromagnetic metal alloy forming variable resistor $R_V$ is equal to the height of the ferromagnetic metal alloy forming target resistor $R_T$. At the point when variable resistor $R_V$ equals target resistor $R_T$, the lapping process is completed. At this point, MR sensors 23a and 23b(shown in FIGS. 2, 3, and 7) located on bottom surface 26 of slider 22 are within an acceptable tolerance of their desired height.

During the lapping process, reference resistor $R_{REF}$ is continuously compared to both variable resistor $R_V$ and target resistor $R_T$. Reference resistor $R_{REF}$ is necessary to prevent erroneous results during the lapping process do to defects in the ferromagnetic metal alloy forming variable resistor $R_V$ or target resistor $R_T$. These erroneous results would give an artificial agreement between resistors $R_V$ and $R_T$ prematurely. Since the resistance of reference resistor $R_{REF}$ must be invariant during the lapping process, reference resistor $R_{REF}$ must be positioned so that the configuration of reference resistor $R_{REF}$ is constant during the lapping process.

Another aspect illustrated in FIG. 6 is the constant 90° angle between contacts 40, 42, 44, and 46 and MR lap monitor resistors $R_{REF}$, $R_V$, and $R_T$. Reference resistor $R_{REF}$ is at a 90° angle from contacts 42 and 44, variable resistor $R_V$ is at a 90° angle from contacts 40 and 44, and target resistor $R_T$ is at a 90° angle from contacts 44 and 46. Therefore, MR lap monitor 20 is designed such that it is self-aligned. Contacts 40, 42, 44, and 46 are self-referenced on one mask set while MR lap monitor resistors $R_{REF}$, $R_V$, and $R_T$ are referenced on another mask set. Hence, any alignment shifts between the mask set referencing contacts 40, 42, 44, and 46 and the mask set referencing MR lap monitor resistors $R_{REF}$, $R_V$, and $R_T$ does not change the essential characteristics of the lap monitor design. In contrast, if the angle between contacts 40, 42, 44, and 46 and MR lap monitor resistors $R_{REF}$, $R_V$, and $R_T$ is not 90°, alignment shifts between the mask set referencing contacts 40, 42, 44, and 46 and the mask set referencing resistors $R_{REF}$, $R_V$, and $R_T$ would cause an unwanted change in resistance, which could provide an erroneous result.

Figure 7:
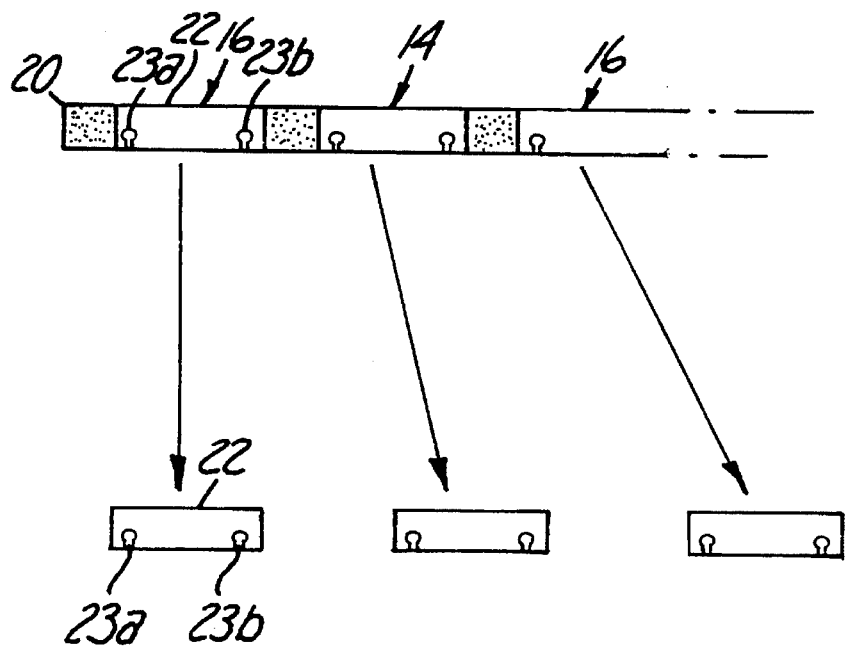
FIG. 7 is a greatly enlarged diagrammatic view showing the bar of MR die being diced into the plurality of sliders bearing the MR sensors.

FIG. 7 is a greatly enlarged diagrammatic view showing the bar of MR die being diced into the plurality of sliders bearing the MR sensors. Once the lapping process has been completed, the bar of MR die are diced through the plurality of MR lap monitors, similar to MR lap monitor 20, thereby freeing the individual sliders from the MR bar. The remaining sliders, similar to slider 22, each have two MR sensors, similar to MR sensors 23a and 23b, fabricated to a proper height for recovering information from a magnetic storage medium.

Although the present invention has been described with reference to preferred embodiments, workers skilled in the art will recognize that changes may be made in form and detail without departing from the spirit and scope of the invention.

What is claimed is:

1. A magnetoresistive lap monitor for determining a final height of a magnetoresistive sensor during a lapping process, the magnetoresistive lap monitor comprising:

a first bond pad;

a first magnetoresistive contact electrically connected to the first bond pad;

a second bond pad;

a second magnetoresistive contact electrically connected to the second bond pad;

a third bond pad;

a third magnetoresistive contact electrically connected to the third bond pad;

a fourth magnetoresistive contact;

a variable resistor electrically connected between the first and fourth magnetoresistive contacts;

a reference resistor connected between the second and fourth magnetoresistive contacts; and a target resistor electrically connected between the third and fourth magnetoresistive contacts.

2. The magnetoresistive lap monitor of claim 1 wherein the first, second, and third bond pads each have circuitry for connection to external hardware.

3. The magnetoresistive lap monitor of claim 1 wherein the first, second, and third magnetoresistive contacts are high conductivity connecting metalization contacts.

4. The magnetoresistive lap monitor of claim 1 wherein the reference, target, and variable resistors are formed from a ferromagnetic metal alloy.

5. The magnetoresistive lap monitor of claim 1 wherein the variable resistor is positioned at a 90° angle from both the first and fourth magnetoresistive contacts.

6. The magnetoresistive lap monitor of claim 1 wherein the reference resistor is positioned at a 90° angle from both the second and fourth magnetoresistive contacts.

7. The magnetoresistive lap monitor of claim 1 wherein the target resistor is positioned at a 90° angle from both the third and fourth magnetoresistive contacts.

* * * * *

UNITED STATES PATENT AND TRADEMARK OFFICE
CERTIFICATE OF CORRECTION

PATENT NO. : 5,559,429

DATED : SEPTEMBER 24, 1996

INVENTOR(S) : GREGORY S. MOWRY, PHILLIP E. GORKA, BRIAN D. STRAYER, ALAN G. KRACKE

It is certified that error appears in the above-indentified patent and that said Letters Patent is hereby corrected as shown below:

Col. 3, line 38, delete "fiat", insert --flat--

Col. 5, line 29, after "resistors", delete "$R_{REf}$,", insert --$R_{REF}$,--

Signed and Sealed this

Seventh Day of January, 1997

Attest:

BRUCE LEHMAN

Attesting Officer

Commissioner of Patents and Trademarks